United States Patent
Shim et al.

(10) Patent No.: US 8,335,871 B2
(45) Date of Patent: Dec. 18, 2012

(54) MEMORY SYSTEM AND METHOD OF DRIVING THE SAME

(75) Inventors: Ho-Jun Shim, Seoul (KR); Je-Hyuck Song, Seoul (KR); Seung-Duk Cho, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1014 days.

(21) Appl. No.: 12/238,592

(22) Filed: Sep. 26, 2008

(65) Prior Publication Data

US 2009/0106509 A1  Apr. 23, 2009

(30) Foreign Application Priority Data

Oct. 22, 2007 (KR) .................. 10-2007-0106258

(51) Int. Cl.
*G06F 13/28* (2006.01)
*G06F 12/00* (2006.01)

(52) U.S. Cl. ............................... 710/22; 711/154
(58) Field of Classification Search .............. 710/22
See application file for complete search history.

(56) References Cited

U.S. PATENT DOCUMENTS

| 6,981,068 B1 * | 12/2005 | Harari et al. ............... 710/2 |
| 2004/0243906 A1 | 12/2004 | Huang |
| 2005/0125708 A1 | 6/2005 | Simon |
| 2006/0224820 A1 * | 10/2006 | Cho et al. ............... 711/103 |
| 2007/0079043 A1 | 4/2007 | Yu et al. |

FOREIGN PATENT DOCUMENTS

KR  1020060078038 A  7/2006

* cited by examiner

*Primary Examiner* — Chun-Kuan Lee
*Assistant Examiner* — Brooke Taylor
(74) *Attorney, Agent, or Firm* — Volentine & Whitt, PLLC

(57) ABSTRACT

Provided are a memory system and a method of driving the same. The method includes setting microcodes in a top control sequencer and multiple channel control sequencers, and executing the microcode set in the top control sequencer. The method may further include checking execution results of the microcode.

15 Claims, 6 Drawing Sheets

Fig. 3

| OneNAND Ch. A Sequencer Control Register | | | |
|---|---|---|---|
| Register Definition | Read/Write ▨  Register Address ▨  Write Only ▨  Read Only ▨  Reserved ▨ | | |
| | Register Address | 31 30 ... 19 18 17 16 15 14 13 12 11 10 ... 4 3 2 1 0 | |
| Start Address | 0x00100600 | SSA | |
| End Address | 0x00100604 | SEA | |
| Command | 0x00100608 | SDC SEC SC | |
| Status | 0x0010060C | SD SB SG SCA0 SR | |

32

MEMORY SYSTEM AND METHOD OF DRIVING THE SAME

PRIORITY CLAIM

A claim of priority is made to Korean Patent Application No. 10-2007-0106258, filed on Oct. 22, 2007, in the Korean Intellectual Property Office, the subject matter of which is hereby incorporated by reference

SUMMARY

The present invention relates to flash memories, and more particularly, to a memory system, including control sequencers, and a method of driving the same.

In order to enhance performance, a memory controller may be designed with hard-wired logic to control instruction sequences of a flash memory. However, a hard-wired logic memory controller is complex in design, has limited extendibility, and has difficulty efficiently controlling multiple flash memories.

In order to enhance extendibility, a memory controller may be designed in firmware to control the instruction sequences of a flash memory. This method is relatively simple in design, but lower in performance.

Embodiments of the present invention provide a memory system including multiple memory devices and a host connected to the memory devices. Each of the memory devices includes a channel control sequencer. The host includes a top control sequencer that controls the channel control sequencer of each of the memory devices.

The top control sequencer and the channel control sequencers may store microcodes, decode the microcodes, and execute the decoded microcodes, respectively.

The host may further include a processor and a direct memory access (DMA). The processor generates the microcodes, and controls the top control sequencer and the memory devices using the microcodes. The DMA transfers the microcodes to the top control sequencer and the channel control sequencer of each of the memory devices.

Each of the memory devices may further include a memory, an interface block interfacing with the memory, and a DMA. The DMA transfers data of the memory to the host under control of the corresponding channel control sequencer.

The microcodes may include instructions for controlling the memories of the memory devices. Also, each of the memories may include a OneNAND™ flash memory.

Each of the memory devices may further include an error correction code (ECC) block for correcting an error in the data. Each of the memories may include a NAND flash memory.

In other embodiments of the present invention, a method of driving a memory system includes setting microcodes in a top control sequencer and multiple channel control sequencers, and executing the microcode set in the top control sequencer. The method may further include checking execution results of the microcode.

Setting the microcode in each of the top control sequencer and the channel control sequencers may include generating the microcodes; transferring the generated microcodes to the top control sequencer and the channel control sequencers, respectively; setting a top-level sequencer control register of the top control sequencer; and inputting a start address of the microcode to a current address of the top-level sequencer control register.

Executing the microcode set in the top control sequencer may include executing the microcode recorded at the current address of the top-level sequencer control register. An interrupt is generated in the top control sequencer when the current address of the top-level sequencer control register is equal to an end address of the microcode. The current address is increased when the current address of the top-level sequencer control register is not equal to the end address of the microcode.

Checking the execution results of the microcode may include, when an error occurs in the top control sequencer, reporting the error and identifying a status register of the top control sequencer.

Executing the microcode recorded at the current address of the top-level sequencer control register may include setting a microcode in each of the channel control sequencers, and executing the microcode set in each of the channel control sequencers. Executing the microcode set in each of the channel control sequencers may include checking the execution results of the microcode.

Setting the microcode in each of the channel control sequencers may include setting a sequencer control register of each of the channel control sequencers, and inputting the start address of the microcode to a current address of the channel sequencer control register.

Executing the microcode set in each of the channel control sequencers may include executing the microcode recorded at the current address of the channel sequencer control register. An interrupt is generated in the channel control sequencer when the current address of the channel sequencer control register is an end address of the microcode. The current address of the channel sequencer control register is increased when the current address of the channel sequencer control register is not the end address of the microcode.

Checking the execution results of the microcode may include, when an error occurs in any one of the channel control sequencers, reporting the error and identifying a status register of each of the channel control sequencers.

The various embodiments of the present invention reduce the load of a host processor in a memory system, including OneNAND™ and/or NAND flash memories, for example.

BRIEF DESCRIPTION OF THE DRAWINGS

The embodiments of the present invention will be described with reference to the attached drawings, wherein like reference numerals refer to like parts unless otherwise specified, and in which:

FIG. 3 is a diagram illustrating a sequencer control register in a control sequencer illustrated in FIG. 1, according to an embodiment of the present invention;

DETAILED DESCRIPTION OF THE EMBODIMENTS

Figure 1:
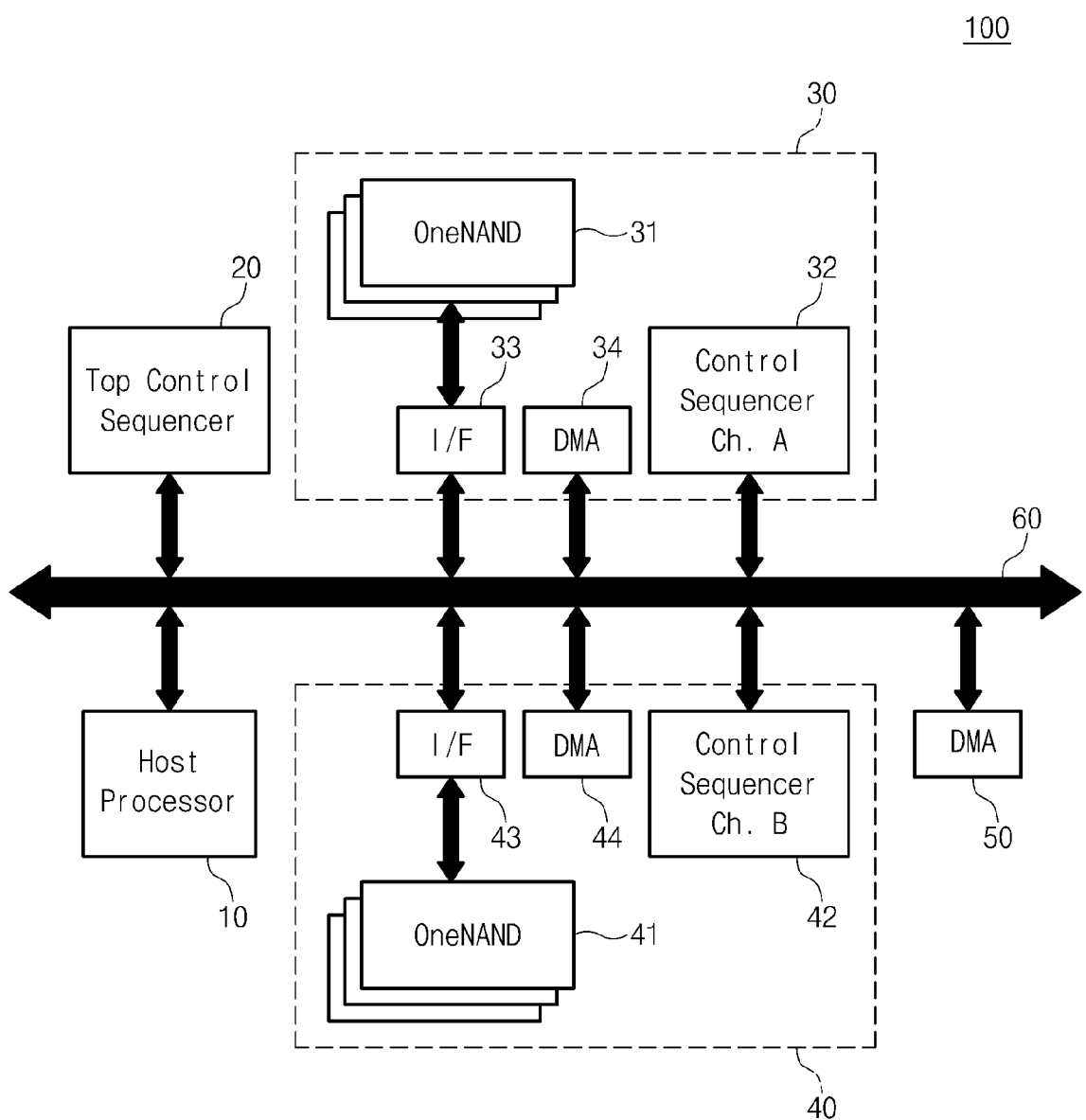
FIG. 1 is a block diagram of a memory system, according to an embodiment of the present invention.

The present invention will now be described more fully with reference to the accompanying drawings, in which exemplary embodiments of the invention are shown. The invention, however, may be embodied in various different forms, and should not be construed as being limited only to the illustrated embodiments. Rather, these embodiments are provided as examples, to convey the concept of the invention to one skilled in the art. Accordingly, known processes, elements, and techniques are not described with respect to some of the embodiments of the present invention. Throughout the drawings and written description, like reference numerals will be used to refer to like or similar elements.

In order to facilitate extendibility of a memory controller and simultaneously maintain high performance, embodiments of the present invention fix, in an initial design stage, a limited number of specific operation scenarios that are expected to be frequently performed in a flash memory system. These specific operation scenarios are provided in hard-wired logic in the memory controller. Other operation scenarios control a flash memory through firmware. Thus, embodiments of the present invention can rapidly cope with changes in the flash memory system specifications (e.g., interleaving degree and read/write unit operation size) and/or the flash memory device specifications (e.g., page size and block size).

Therefore, embodiments of the present invention provide high performance with respect to anticipated operations and functionality considered in design stages, and also provide extendibility for operations and functionality not fully considered in the design stages.

FIG. 1 is a block diagram of a memory system, according to an illustrative embodiment of the invention.

Referring to FIG. 1, a memory system 100 according to an embodiment of the present invention includes a host processor 10, a top control sequencer 20, a first memory device 30, a second memory device 40, a direct memory access (DMA) 50, and a system bus 60.

The first memory device 30 may include a first flash memory 31 (e.g., first OneNAND™ flash memory), a channel-A (Ch. A) control sequencer 32, a first interface 33, and a first device DMA 34. The second memory device 40 may include a second flash memory 41 (e.g., second OneNAND™ flash memory), a channel-B (Ch. B) control sequencer 42, a second interface 43, and a second device DMA 44.

The host processor 10 is configured to generate microcodes (μ-codes). The microcodes are instructions that control memories included in the first and second memory devices 30 and 40, respectively, of the memory system 100. The microcodes will be described in detail with reference to FIG. 2.

The DMA 50 transfers the microcodes, which have been generated by the host processor 10, through the system bus 60 to the top control sequencer 20 and to the Ch. A and Ch. B control sequencers 32 and 42 of the first and second memory devices 30 and 40. The microcodes transferred by the DMA 50 are stored in sequencer internal memories (not shown) of the Ch. A and Ch. B control sequencers 32 and 42, respectively. The microcodes stored in the sequencer internal memories are fetched and executed by the Ch. A and Ch. B control sequencers 32 and 42.

Alternatively, the microcodes may be generated by a user. When the microcodes are generated by the user, the generated microcodes may be previously stored in the top control sequencer 20 and the channel control sequencers 32 and 42.

Sequencer control registers (not shown) in each of the Ch. A and Ch. B control sequencers 32 and 42 and the top control sequencer 20 will be described in detail with reference to FIG. 3.

The Ch. A control sequencer 32 of the first memory device 30 executes the microcode transferred by the DMA 50. In response to the executed microcode of the Ch. A control sequencer 32, the first device DMA 34 transfers data of the first flash memory 31 through the first interface 33 to the host processor 10 via the system bus 60. Operation of the Ch. B control sequencer 42 of the second memory device 40 is similar to the operation of the Ch. A control sequencer 32 of the first memory device 30. That is, the Ch. B control sequencer 42 executes the microcode transferred by the DMA 50. In response to the executed microcode, the second device DMA 44 transfers data of the second flash memory 41 through the second interface 43 to the host processor 10 via the system bus 60.

As described above, the memory system according to the present embodiment uses the microcodes to control the memory devices equipped therein, thus making it possible to reduce the load of the host processor in the memory system. Also, when the specifications of the memory device are changed, the memory system can control the memory device with the changed specifications by modifying the microcode.

Figure 2:
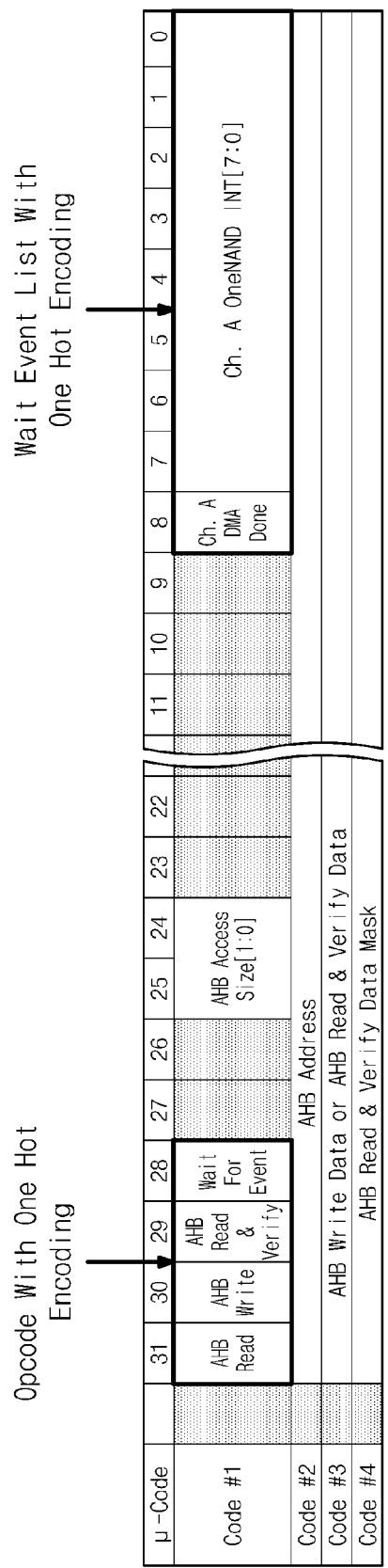
FIG. 2 is a diagram illustrating microcodes, according to an embodiment of the present invention.

FIG. 2 is a diagram illustrating a microcode, stored for example in internal memory of the Ch. A control sequencer 32, according to an illustrative embodiment of the invention.

Referring to FIGS. 1 and 2, a microcode according to the depicted embodiment may be configured to include 128 bits, for example. More particularly, the microcode includes a combination of a first microcode Code #1, a second microcode Code #2, a third microcode Code #3, and a fourth microcode Code #4.

In the example depicted in FIG. 2, the $0^{th}$ through $7^{th}$ bits of the first microcode Code #1 contain interrupt information about multiple memories in the first flash memory 31. The $8^{th}$ bit of the first microcode Code #1 represents operation done information of the first device DMA 34. The $24^{th}$ and $25^{th}$ bits of the first microcode Code #1 represent access size information of the system bus 60. The $28^{th}$ bit of the first microcode Code #1 represents a wait-for-event operation, the $29^{th}$ bit of the first microcode Code #1 represents a read & verify operation, the $30^{th}$ bit of the first microcode Code #1 represents a write operation, and the $31^{st}$ bit of the first microcode Code #1 represents a read operation.

Also, in the depicted example, the second microcode Code #2 contains address information of the system bus, the third microcode Code #3 contains write data or read & verify data, and the fourth microcode Code #4 contains read & verify mask data.

The Ch. A and Ch. B control sequencers 32 and 42 use the microcodes to control read operations, write operations, read & verify operations, and wait-for-event operations with respect to the first and second flash memories 31 and 41 of the first and second memory devices 30 and 40, respectively.

FIG. 3 is a diagram illustrating a sequencer control register in the Ch. A control sequencer 32 illustrated in FIG. 1, according to an illustrative embodiment of the invention.

Referring to FIGS. 1 and 3, the sequencer control register in the Ch. A control sequencer 32 according to the depicted embodiment includes a start address register, an end address register, a command register, and a status register, indicated in the left-most column. The start address register stores a sequencer start address. The end address register stores a sequencer end address. The command register stores a sequencer done clear SDC, sequencer error clear SEC, and sequencer run SR indicators or commands. The status register stores sequencer done SD, sequencer busy SB, sequencer error SE, and sequencer current address offset SCAO indicators or commands.

The sequencer internal memory according to the present embodiment may include a dual-port static random access memory (SRAM), for example.

The sequencer control registers of the top control sequencer 20 and the Ch. B control sequencer 42 are configured in substantially the same manner as the sequencer control register of the Ch. A control sequencer 32, shown in FIG. 3. Accordingly, additional description of these sequencer control registers will not be repeated for conciseness.

Figure 4:
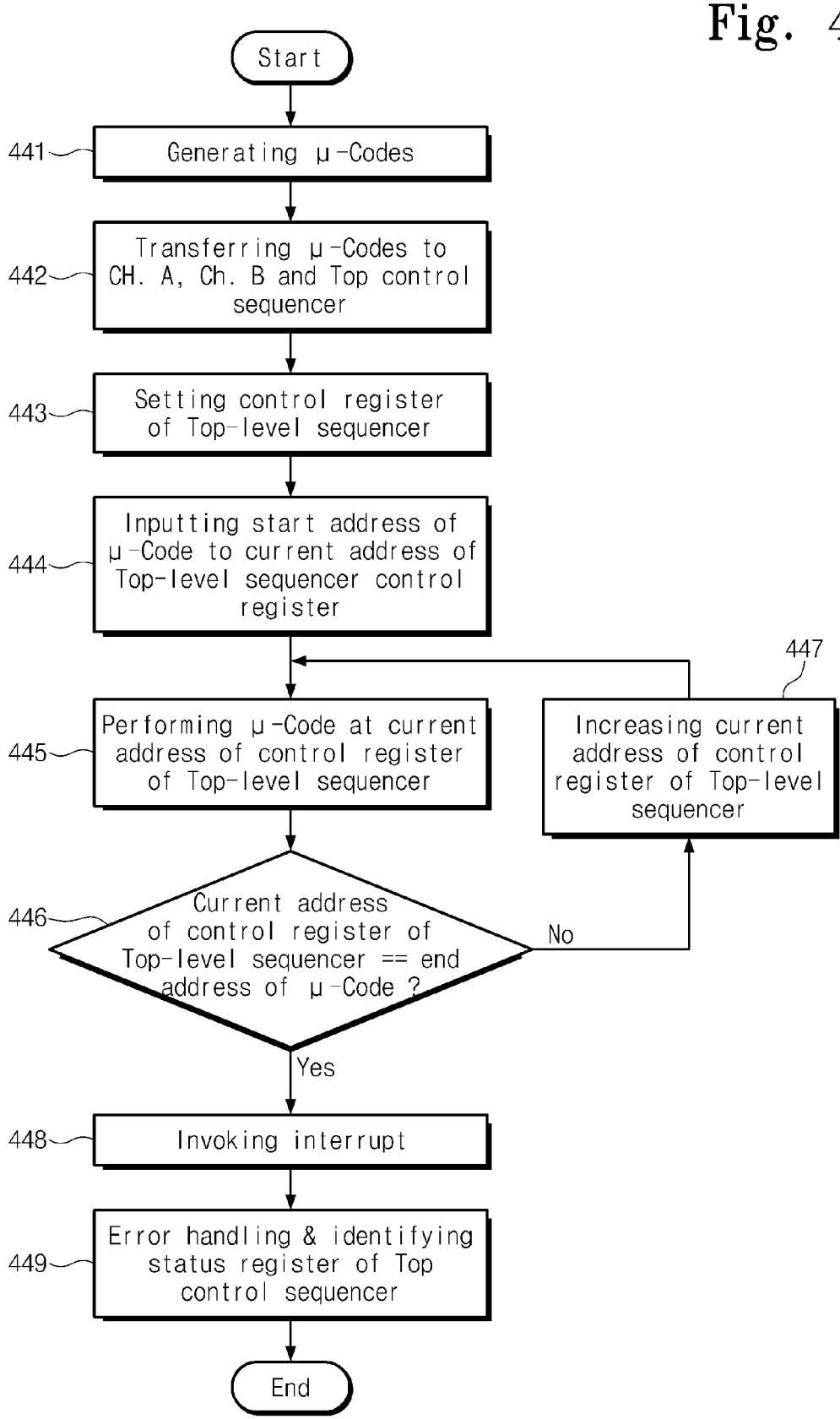
FIG. 4 is a flow diagram illustrating operation of a top control sequencer illustrated in FIG. 1, according to an embodiment of the present invention.
Figure 5:
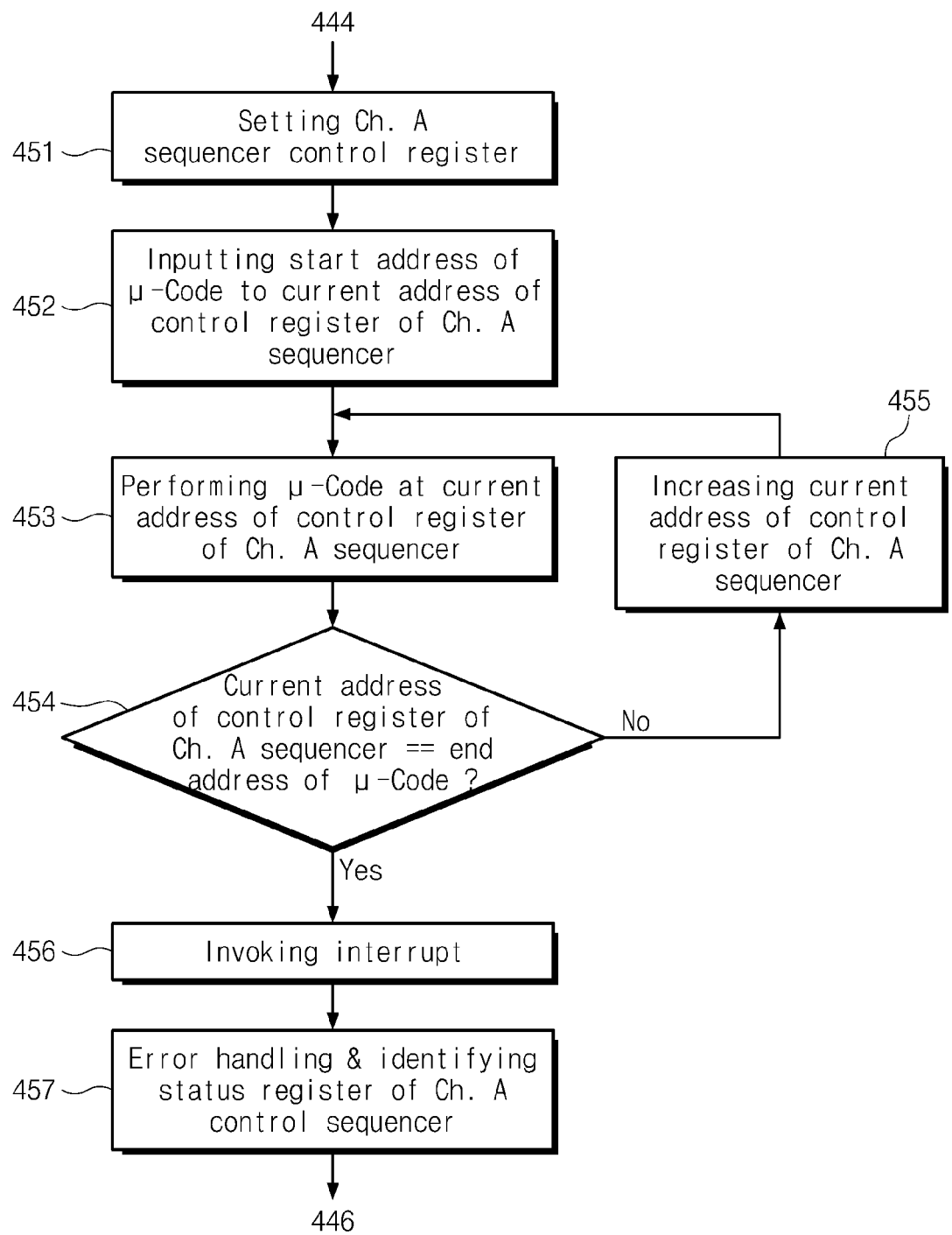
FIG. 5 is a flow diagram illustrating operation of a channel control sequencer during operation of the top control sequencer illustrated in FIG. 4, according to an embodiment of the present invention.

FIG. 4 is a flow diagram illustrating operation of the top control sequencer 20 of FIG. 1, according to an illustrative embodiment of the invention. FIG. 5 is a flow diagram illustrating operation of the Ch. A control sequencer 32 during the operation of the top control sequencer 20 illustrated in FIG. 4, according to an illustrative embodiment of the invention.

Referring to FIGS. 1 through 5, a method of driving the memory system 100, according to an illustrative embodiment of the invention is as follows.

In step 441 of FIG. 4, the host processor 10 generates microcodes. In step 442, the DMA 50 transfers the generated microcodes to the top control sequencer 20 and the Ch. A and Ch. B control sequencers 32 and 42.

In step 443, the top control sequencer 20 sets a top-level sequencer control register. That is, the top control sequencer 20 sets the microcode received from the DMA 50 in a start address register, an end address register, a command register, and a status register of the top-level sequencer control register. In step 444, the top control sequencer 20 inputs a start address of the microcode to a current address of the top-level sequencer control register.

In step 445, the top control sequencer 20 performs a process for executing the microcode recorded at the current address of the top-level sequencer control register. That is, the top control sequencer 20 uses the microcode to control the Ch. A and Ch. B control sequencers 32 and 42. Each of the first and second memory devices 30 and 40 occupies the system bus 60 under the control of the top control sequencer 20.

The process indicated by step 445 is set forth in detail in FIG. 5. Notably, FIG. 5 is directed to operations of the Ch. A control sequencer 32, for purposes of explanation. The Ch. A and Ch. B control sequencers 32 and 42 operate independently in the respective memory devices. However, it is understood that operations of the Ch. B control sequencer 42 are similar to the operations of the Ch. A control sequencer 32, and thus a detailed description only of the Ch. A control sequencer 32 operations will be provided for conciseness.

In step 451 of FIG. 5, the Ch. A control sequencer 32 sets the microcode received from the DMA 50 in a start address register, an end address register, a command register, and a status register of a Ch. A sequencer control register. In step 452, the Ch. A control sequencer 32 inputs a start address of the microcode to a current address of the Ch. A sequencer control register. In step 453, the Ch. A control sequencer 32 executes the microcode recorded at the current address of the Ch. A sequencer control register.

In step 454, the Ch. A control sequencer 32 determines whether the current address of the Ch. A sequencer control register is the end address of the microcode. When the current address of the Ch. A sequencer control register is the end address of the microcode, the Ch. A control sequencer 32 generates an interrupt signal in step 456. On the other hand, when the current address of the Ch. A sequencer control register is not the end address of the microcode, the Ch. A control sequencer 32 increases the current address of the Ch. A sequencer control register in step 455 and returns to step 453.

If an error occurs in any one of Ch. A control sequencers, the Ch. A control sequencer 32 reports the error and identifies the status registers of the channel control sequencers, in step 457.

The Ch. A and Ch. B control sequencers 32 and 42 operate in parallel. Upon completion of the operations of the Ch. A and Ch. B control sequencers 32 and 42, the process returns to FIG. 4. It is determined at step 446 whether the current address of the top-level sequencer control register is the end address of the microcode. When the current address of the top-level sequencer control register is the end address of the microcode, the top control sequencer 20 generates an interrupt signal in step 448. On the other hand, when the current address of the top-level sequencer control register is not the end address of the microcode, the top control sequencer 20 increases the current address of the top-level sequencer control register in step 447 and returns to step 445.

If an error occurs, the top control sequencer 20 reports the error and identifies the status register of the top control sequencer, in step 449.

Figure 6:
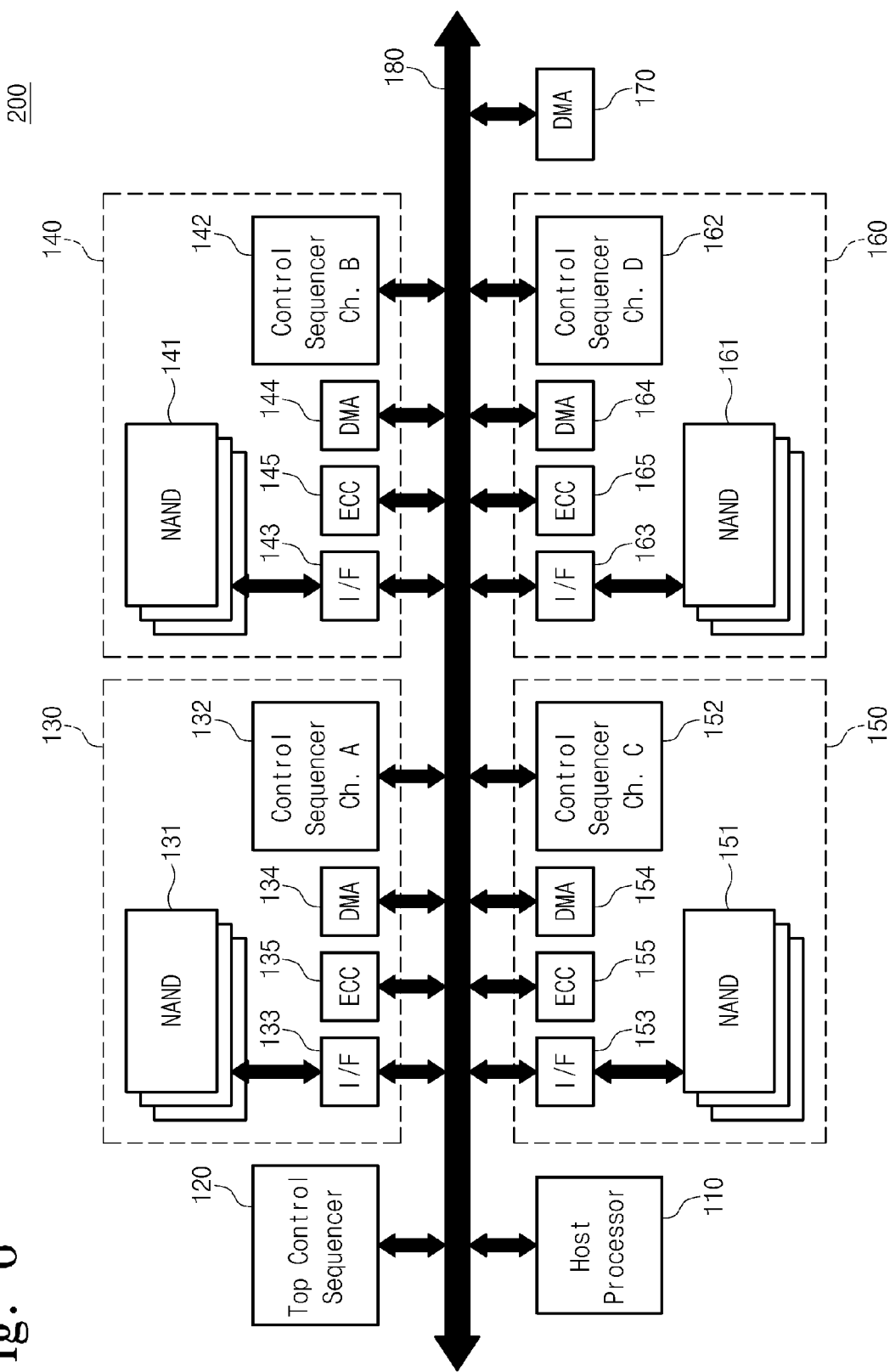
FIG. 6 is a block diagram of a memory system, according to an embodiment of the present invention.

FIG. 6 is a block diagram of a memory system, according to another illustrative embodiment of the present invention.

Referring to FIG. 6, a memory system 200 includes a host processor 110, a top control sequencer 120, first through fourth memory devices 130 through 160, a DMA 170, and a system bus 180.

The first memory device 130 includes a first NAND flash memory 131, a Ch. A control sequencer 132, a first interface 133, a first device DMA 134, and a first error correction (ECC) block 135. The second memory device 140 includes a second NAND flash memory 141, a Ch. B control sequencer 142, a second interface 143, a second device DMA 144, and a second ECC block 145. The third memory device 150 includes a third NAND flash memory 151, a Ch. C control sequencer 152, a third interface 153, a third device DMA 154, and a third ECC block 155. The fourth memory device 160 includes a fourth NAND flash memory 161, a Ch. D control sequencer 162, a fourth interface 163, a fourth device DMA 164, and a fourth ECC block 165.

Microcodes generated by the host processor 110 control memories included in the first through fourth memory devices 130 through 160 equipped in the memory system 200. The DMA 170 transfers the microcodes, which have been generated by the host processor 110, through the system bus 180 to the top control sequencer 120 and the Ch. A through Ch. D control sequencers 132, 142, 152 and 162 of the first through fourth memory devices 130, 140, 150 and 160, respectively. The microcodes transferred by the DMA 170 are stored in sequencer internal memories (not shown) of the Ch. A through Ch. D control sequencers 132, 142, 152 and 162.

The Ch. A control sequencer 132 of the first memory device 130 executes the microcode transferred by the DMA 170. In response to the executed microcode of the Ch. A control sequencer 132, the first device DMA 134 corrects an error in data of the first NAND flash memory 131 by the first ECC block 135 and transfers the resulting data through the first interface 133 to the host processor 110.

Operations of the respective control sequencers of the second through fourth memory devices 140, 150 and 160 are similar to the operation of the Ch. A control sequencer 132 of the first memory device 130. Therefore, detailed descriptions will not be repeated for conciseness.

As described above, the memory system, according to embodiments of the present invention, uses microcodes to control memory devices equipped therein, thus making it possible to reduce the load of a host processor in the memory system. Also, when specifications of the memory device are changed, the memory system can control the memory device with the changed specifications by modifying the microcodes. It is thus possible, for example, to reduce the load of the host processor in the memory system.

While the present invention has been described with reference to exemplary embodiments, it will be apparent to those skilled in the art that various changes and modifications may be made without departing from the spirit and scope of the present invention. Therefore, it should be understood that the above embodiments are not limiting, but illustrative.

What is claimed is:

1. A memory system comprising:
   a first memory device connected to a system bus and comprising a first control sequencer that receives, stores and executes first microcode to control operation of the first memory device;
   a second memory device connected to the system bus and comprising a second control sequencer that receives, stores and executes second microcode to control operation of the second memory device;
   a host connected to the first and second memory devices via the system bus, the host comprising a top control sequencer that receives, stores and executes main microcode to control operation of the first and second control sequencers; and
   a system direct memory access (DMA) that transfers the first microcode to the first control sequencer, the second microcode to the second control sequencer, and the main microcode to the top control sequencer via the system bus.

2. The memory system of claim 1, wherein the host further comprises:
   a processor that generates the first microcode, the second microcode, and the main microcode.

3. The memory system of claim 2, wherein the first memory device further comprises:
   a first memory that stores first data received via the system bus;
   an interface block that serves as an interface between the first memory and the system bus; and
   a first DMA that controls transfer of the first data between the first memory and the system bus under the control of the first control sequencer, and in conjunction with the system DMA controls transfer of the first microcode to the first control sequencer; and
   the second memory device further comprises:
   a second memory that stores second data received via the system bus;
   an interface block that serves as an interface between the second memory and the system bus; and
   a second DMA that controls transfer of the second data between the memory and the system bus under the control of the second control sequencer, and in conjunction with the system DMA controls transfer of the second microcode to the second control sequencer.

4. The memory system of claim 3, wherein the first memory device further comprises an error correction code (ECC) block correcting an error in the first data; and
   the second memory device further comprises an ECC block correcting an error in the second data.

5. The memory system of claim 4, wherein at least one of the first memory and the second memory is a NAND flash memory.

6. A method controlling operation of a memory system, comprising:
   transferring and storing first microcode to a first control sequencer of a first memory device connected to a system bus using a system direct memory access (DMA);
   transferring and storing second microcode to a second control sequencer of a second memory device connected to the system bus using the system DMA;
   transferring and storing main microcode to a top control sequencer connected to the system bus using the system DMA;
   executing the main microcode in the top control sequencer to control operation of the first control sequencer and the second control sequencer; and
   in response to execution of the main microcode by the top sequencer, executing the first microcode in the first sequencer to control operation of the first memory device, and executing the second microcode in the second sequencer to control operation of the second memory device.

7. The method of claim 6, further comprising:
   generating the first microcode, the second microcode and the main microcode using a host processor connected to the system bus.

8. The method of claim 7, wherein executing the main microcode in the top control sequencer comprises:
   executing a portion of the main microcode stored at a current address of a control register in the top control sequencer;
   generating an interrupt for the top control sequencer when the current address is equal to an end address of in the main microcode; and
   increasing the current address when the current address is not equal to the end address in the main microcode.

9. The method of claim 8, further comprising:
   checking execution of the main microcode by the top control sequencer; and
   if an error occurs reporting the error using a status register in the top control sequencer.

10. The method of claim 9, wherein executing the portion of the main microcode comprises:
    selecting a first portion of the first microcode for the first control sequencer, and executing the first portion of the first microcode using the first control sequencer; and
    selecting a second portion of the second microcode for the second control sequencer, and executing the second portion of the second microcode using the second control sequencer.

11. The method of claim 10, wherein executing the first portion of the first microcode comprises:
    executing a portion of the first microcode stored at a current address of a first control register of the first control sequencer;
    generating an interrupt for the first control sequencer when the current address is an end address of the first microcode; and
    increasing the current address when the current address is not the end address of the first microcode.

12. The method of claim 10, wherein executing the second portion of the second microcode comprises:
    executing a portion of the second microcode stored at a current address of a second control register of the second control sequencer;
    generating an interrupt for the second control sequencer when the current address is an end address of the first microcode; and increasing the current address when the current address is not the end address of the first microcode.

13. A method of operating a memory system, comprising:
configuring the memory system by selectively and independently connecting a first memory device including a first control sequencer and a second memory device including a second control sequencer with a system bus connecting a host processor, system direct memory access (DMA), and a top control sequencer;
generating first microcode, second microcode and main microcode using the host processor;
transferring and storing the first microcode to the first control sequencer using the system DMA;
transferring and storing the second microcode to the second control sequencer using the system DMA;
transferring and storing the main microcode to the top control sequencer using the system DMA;
executing the main microcode in the top control sequencer to control operation of the first control sequencer and the second control sequencer; and
in response to execution of the main microcode in the top control sequencer, executing the first microcode in the first sequencer to control operation of the first memory device, and executing the second microcode in the second sequencer to control operation of the second memory device.

14. A memory system comprising:
a plurality of memory devices connected to a system bus, each comprising a channel control sequencer; and
a host connected to the plurality of memory devices, the host comprising a top control sequencer controlling the channel control sequencer of each of the memory devices, a processor generating the microcodes, and controlling the top control sequencer and the memory devices using the microcodes, and a direct memory access (DMA) transferring the microcodes to the top control sequencer and the channel control sequencer of each of the memory devices,
wherein the top control sequencer and the channel control sequencers store microcodes, decode the microcodes, and execute the decoded microcodes, respectively.

15. A method of driving a memory system, the memory system including a plurality of memory devices connected to a system bus, each comprising a channel control sequencer, and a host connected to the plurality of memory devices, the host comprising a top control sequencer controlling the channel control sequencer of each of the memory devices, a processor generating the microcodes, and controlling the top control sequencer and the memory devices using the microcodes, and a direct memory access (DMA) transferring the microcodes to the top control sequencer and the channel control sequencer of each of the memory devices, the method comprising:
setting microcodes in the top control sequencer and the plurality of channel control sequencers; and
executing the microcode set in the top control sequencer,
wherein setting the microcode in each of the top control sequencer and the plurality of channel control sequencers comprises:
generating the microcodes by the processor;
transferring the generated microcodes to the top control sequencer and the channel control sequencers, respectively;
setting a top-level sequencer control register of the top control sequencer; and
inputting a start address of the microcode to a current address of the top-level sequencer control register.

* * * * *